(12) United States Patent
Matsushita et al.

(10) Patent No.: US 11,155,487 B2
(45) Date of Patent: Oct. 26, 2021

(54) METHOD FOR MANUFACTURING INFRARED-TRANSMISSIBLE LENS, INFRARED-TRANSMISSIBLE LENS, AND INFRARED CAMERA

(71) Applicant: NIPPON ELECTRIC GLASS CO., LTD., Otsu (JP)

(72) Inventors: Yoshimasa Matsushita, Otsu (JP); Fumio Sato, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 3 days.

(21) Appl. No.: 16/091,611

(22) PCT Filed: Apr. 24, 2017

(86) PCT No.: PCT/JP2017/016237
§ 371 (c)(1),
(2) Date: Oct. 5, 2018

(87) PCT Pub. No.: WO2018/016149
PCT Pub. Date: Jan. 25, 2018

(65) Prior Publication Data
US 2019/0127259 A1 May 2, 2019

(30) Foreign Application Priority Data

Jul. 20, 2016 (JP) .............................. JP2016-142059

(51) Int. Cl.
*C03B 23/00* (2006.01)
*C03B 19/06* (2006.01)
(Continued)

(52) U.S. Cl.
CPC .......... *C03B 23/0013* (2013.01); *C03B 11/00* (2013.01); *C03B 19/02* (2013.01);
(Continued)

(58) Field of Classification Search
None
See application file for complete search history.

(56) References Cited

U.S. PATENT DOCUMENTS 5,315,434 A * 5/1994 Mizuno .................. C03C 3/321
250/338.1
2010/0285946 A1* 11/2010 Tani ......................... C03C 4/10
501/40

(Continued)

FOREIGN PATENT DOCUMENTS

CN 101910080 A 12/2010
CN 104310755 A 1/2015
(Continued)

OTHER PUBLICATIONS

JPH02160631A EPO Machine Translation Performed Dec. 9, 2020. (Year: 2020).*
(Continued)

*Primary Examiner* — Lisa L Herring
(74) *Attorney, Agent, or Firm* — Keating and Bennett, LLP

(57) ABSTRACT

Provided is a method for manufacturing an infrared-transmissive lens having an excellent surface quality. A method for manufacturing an infrared-transmissive lens includes firing a preform of a chalcogenide glass in an inert gas atmosphere to obtain a fired body and then subjecting the fired body to hot press molding.

9 Claims, 1 Drawing Sheet

(51) Int. Cl.
*C03C 4/10* (2006.01)
*C03B 19/02* (2006.01)
*G02B 1/00* (2006.01)
*C03B 11/00* (2006.01)
*C03C 3/32* (2006.01)
*G02B 3/00* (2006.01)

(52) U.S. Cl.
CPC ............... *C03B 19/06* (2013.01); *C03C 3/32* (2013.01); *C03C 3/321* (2013.01); *C03C 3/323* (2013.01); *C03C 4/10* (2013.01); *G02B 1/00* (2013.01); *C03B 2201/86* (2013.01); *C03B 2215/46* (2013.01); *G02B 3/00* (2013.01)

(56) References Cited

U.S. PATENT DOCUMENTS

| | | | |
|---|---|---|---|
| 2017/0057856 A1* | 3/2017 | Ashida | C03C 4/10 |
| 2018/0099898 A1* | 4/2018 | Kadono | C03B 11/122 |

FOREIGN PATENT DOCUMENTS

| | | | | |
|---|---|---|---|---|
| JP | 02160631 A | * | 6/1990 | ............ C03B 11/12 |
| JP | 05-229838 A | | 9/1993 | |
| JP | 06-092651 A | | 4/1994 | |
| JP | 06-092652 A | | 4/1994 | |
| JP | 06-183760 A | | 7/1994 | |
| JP | 06-211540 A | | 8/1994 | |
| JP | 2009-161374 A | | 7/2009 | |
| JP | 2010-072484 A | | 4/2010 | |
| JP | 2010-285308 A | | 12/2010 | |
| WO | 2009/084619 A1 | | 7/2009 | |

OTHER PUBLICATIONS

Official Communication issued in European Patent Application No. 17830669.2, dated Feb. 10, 2020.
Cha et al.; "Experimental Study of the Fabrication of Chalcogenide Glass Lenses by Using Precision Glass Molding"; Journal of the Korean Physical Society; vol. 65, No. 10; Dec. 6, 2014; pp. 1675-1681.
Official Communication issued in International Patent Application No. PCT/JP2017/016237, dated Jul. 18, 2017.
Official Communication issued in corresponding Chinese Patent Application No. 201780022608.6, dated Oct. 10, 2020.

* cited by examiner

[FIG. 1]
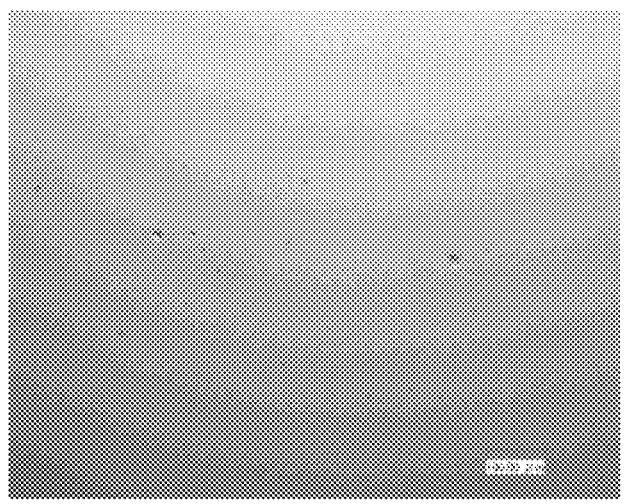
[FIG. 2]
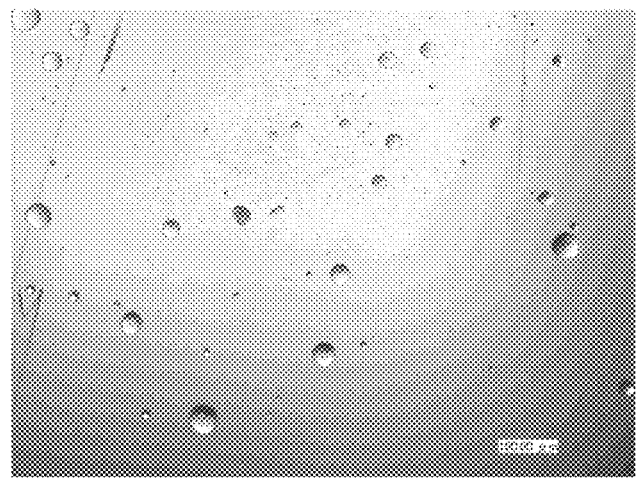

METHOD FOR MANUFACTURING INFRARED-TRANSMISSIBLE LENS, INFRARED-TRANSMISSIBLE LENS, AND INFRARED CAMERA

TECHNICAL FIELD

The present invention relates to methods for manufacturing infrared-transmissive lenses for use in infrared sensors, infrared cameras, and so on.

BACKGROUND ART

Vehicle-mounted night vision devices, security systems, and the like include infrared sensors for use to detect living bodies at night. To sense infrared rays with wavelengths of about 8 to 14 μm emitted from living bodies, such an infrared sensor is provided, in front of the sensor section, with an optical element, such as a filter or a lens, capable of transmitting infrared rays in the above wavelength range.

Examples of a material for the optical element as described above include Ge, Zn, and Se. These materials are crystalline bodies and therefore poor in processability, which makes them difficult to process into complicated shapes, such as an aspheric lens. For this reason, these materials have the problem of making mass production of the above optical element difficult and also have the problem of making size reduction of the infrared sensor difficult.

To cope with the above, chalcogenide glasses are proposed as vitreous materials that can transmit infrared rays with wavelengths of about 8 to 14 μm and are relatively easily processable (see, for example, Patent Literature 1).

Chalcogenide glasses are moldable and can provide optical elements, such as an aspheric lens, by hot pressing chalcogenide glass sandwiched between an upper mold half and a lower mold half (see, for example, Patent Literature 2).

CITATION LIST

Patent Literature

[PTL1]
JP-A-2009-161374
[PTL2]
JP-A-H06-211540

SUMMARY OF INVENTION

Technical Problem

Chalcogenide glasses have a drawback that heat applied thereto during pressing causes depressions to be formed in an optical element surface of a molded lens, thus deteriorating the surface quality of the lens. If a large number of depressions are formed in the surface of the optical element, its use as a lens on a camera incurs the occurrence of distortion or corruption of an image formed by the lens.

The present invention has been made in view of the above situation and, therefore, has an object of providing a method for manufacturing an infrared-transmissive lens having an excellent surface quality.

Solution to Problem

The inventors have conducted various studies, consequently have made the following findings, and have proposed the present invention based on the findings. Chalcogenide glass generates a gas during hot press molding by reaction of surface-adsorbed water on the chalcogenide glass with a component in the chalcogenide glass. For example, in the case of a sulfide-based chalcogenide glass containing much sulfur, surface-adsorbed water on the glass reacts with sulfur in the glass, so that $H_2S$ generates from the glass surface. If the gas generates at the interface between the chalcogenide glass and the mold assembly, depressions are likely to be formed in the lens surface after hot press molding, so that the surface quality is likely to deteriorate. To cope with this, if prior to hot press molding a preform of the chalcogenide glass is fired in an inert gas atmosphere, surface-adsorbed water on the glass can be removed. Thus, a gas is less likely to generate during hot press molding of the fired body of the chalcogenide glass and, therefore, depressions becomes less likely to be formed in the lens surface after the hot press molding.

A method for manufacturing an infrared-transmissive lens according to the present invention includes firing a preform of a chalcogenide glass in an inert gas atmosphere to obtain a fired body and then subjecting the fired body to hot press molding.

In the method for manufacturing an infrared-transmissive lens according to the present invention, the preform is preferably fired at a temperature 0 to 50° C. lower than a deformation point of the chalcogenide glass.

In the method for manufacturing an infrared-transmissive lens according to the present invention, the preform is preferably fired in a nitrogen atmosphere.

In the method for manufacturing an infrared-transmissive lens according to the present invention, the fired body is preferably subjected to the hot press molding at a temperature equal to or higher than a deformation point of the chalcogenide glass and equal to or lower than a softening point of the chalcogenide glass.

In the method for manufacturing an infrared-transmissive lens according to the present invention, the fired body is preferably subjected to the hot press molding in an inert gas atmosphere.

In the method for manufacturing an infrared-transmissive lens according to the present invention, the fired body is preferably subjected to the hot press molding in a nitrogen atmosphere.

In the method for manufacturing an infrared-transmissive lens according to the present invention, the chalcogenide glass preferably contains at least one of S, Se, and Te.

In the method for manufacturing an infrared-transmissive lens according to the present invention, the chalcogenide glass preferably contains S+Se+Te in an amount of 30 to 80% by mole.

An infrared-transmissive lens according to the present invention is made of a chalcogenide glass and has, per unit area (1 mm×1 mm) in a surface thereof, 100 or smaller number of depressions having a diameter of not less than 2.5 μm and not more than 100 μm.

An infrared camera according to the present invention on which the infrared-transmissive lens is used.

Advantageous Effects of Invention

The present invention enables provision of a method for manufacturing an infrared-transmissive lens having an excellent surface quality.

BRIEF DESCRIPTION OF DRAWINGS

FIG. 1 is a photograph showing a surface state of a lens obtained in Example.

FIG. 2 is a photograph showing a surface state of a lens obtained in Comparative Example.

DESCRIPTION OF EMBODIMENTS

A method for manufacturing an infrared-transmissive lens according to the present invention includes firing a preform of a chalcogenide glass in an inert gas atmosphere to obtain a fired body and then subjecting the fired body to hot press molding. Hereinafter, a detailed description will be given of the method for manufacturing an infrared-transmissive lens according to the present invention.

First, a preform of a chalcogenide glass is obtained, for example, in the following manner. The composition of the chalcogenide glass will be described later. Raw materials are mixed to give a desired glass composition, thus obtaining a raw material batch. Next, a silica glass ampoule is evacuated with the application of heat, the raw material batch is then put into the silica glass ampoule, and the silica glass ampoule is sealed with an oxygen burner while being evacuated. The sealed silica glass ampoule is raised in temperature to 650 to 1000° C. at a rate of 10° C. to 20° C./hour in a melting furnace and then held for six to twelve hours. During the holding time, the silica glass ampoule is turned upside down as necessary to stir the melt. Thereafter, the silica glass ampoule is taken out of the melting furnace and rapidly cooled to room temperature, thus obtaining a chalcogenide glass. The obtained chalcogenide glass is processed by cutting, polishing, and so on, thus obtaining a preform of the chalcogenide glass.

The obtained preform is fired, thus obtaining a fired body. Thus, generation of gas from the glass surface can be prevented as described previously.

The firing atmosphere is an inert atmosphere and preferably a nitrogen, argon or helium atmosphere. Particularly preferred is a nitrogen atmosphere because of its inexpensiveness. If firing is performed without controlling the atmosphere, the glass may be oxidized, so that its infrared transparency tends to decrease. The firing temperature is preferably 0 to 50° C. lower than the deformation point of the glass, more preferably 0 to 40° C. lower than that, and particularly preferably 0 to 20° C. lower than that. If the firing temperature is too high, surface-adsorbed water on the chalcogenide glass reacts with a component in the chalcogenide glass during firing to generate a gas, which deteriorates the surface quality of the fired body. On the other hand, if the firing temperature is too low, surface-adsorbed water on the glass cannot completely be removed, so that a gas generates during hot press molding and, thus, the surface quality after the molding tends to deteriorate.

The obtained fired body is subjected to hot press molding in a mold assembly, thus obtaining an infrared-transmissive lens. The hot pressing atmosphere is an inert atmosphere and, for example, preferably a nitrogen, argon or helium atmosphere. Particularly preferred is a nitrogen atmosphere because of its inexpensiveness. If hot pressing is performed without controlling the atmosphere, the glass may be oxidized, so that its infrared transparency tends to decrease. Furthermore, the mold assembly is oxidized to promote its deterioration and shorten its utilization life, which tends to raise the production cost. The pressing temperature is preferably not more than the deformation point of the glass and not less than the softening point of the glass, more preferably 0 to 50° C. higher than the deformation point of the glass, still more preferably 0 to 30° C. higher than the deformation point of the glass, and particularly preferably 0 to 20° C. higher than the deformation point of the glass. If the pressing temperature is too low, the glass does not soften and deform, so that the glass may be broken by pressure of the pressing. On the other hand, if the pressing temperature is too high, the amount of gas generated during pressing increases and, thus, the surface quality of the lens after the molding tends to deteriorate. The mold assembly preferably has an optically polished surface. Furthermore, the lens preferably has a meniscus shape.

The infrared-transmissive lens produced according to the present invention has an excellent surface quality. Specifically, the number of depressions having a diameter of not less than 2.5 µm and not more than 100 µm per unit area (1 mm×1 mm) of the lens is preferably 100 or less, more preferably 50 or less, still more preferably 30 or less, and particularly preferably 10 or less. Since the infrared-transmissive lens produced according to the present invention has an excellent surface quality, it is suitable as an optical element, such as a lens for focusing infrared light on an infrared sensor section of an infrared camera.

Hereinafter, a description will be given of a chalcogenide glass for use in the present invention.

The chalcogenide glass preferably contains at least one of S, Se, and Te. These chalcogen elements, S, Se, and Te, are components for forming the glass network. The S+Se+Te content (the total amount of S, Se, and Te) is, in % by mole, preferably 30 to 80% and more preferably 35 to 70%. If the S+Se+Te content is too small, vitrification becomes difficult. On the other hand, if it is too large, the weather resistance may decrease.

The preferred chalcogen element to be selected is S or Te from an environmental viewpoint.

The chalcogenide glass may contain, in addition to the above components, the following components.

Ge, Ga, Sb, Bi, and, Sn are components that widen the vitrification range and increase the thermal stability of glass and the content of each of them is, in % by mole, preferably 0 to 50% and more preferably 0 to 40%. If the content of each of them is too large, vitrification becomes difficult.

Zn, In, and P are components that widen the vitrification range and the content of each of them is, in % by mole, preferably 0 to 20% by mole. If the content of each of them is too large, vitrification becomes difficult.

Cl, F, and I are components that widen the range of infrared transmission wavelengths and the content of each of them is, in % by mole, preferably 0 to 20% by mole. If the content of each of them is too large, the weather resistance is likely to decrease.

The chalcogenide glass is preferably substantially free of As, Cd, Tl, and Pb which are toxic substances. By doing so, effects on the environment can be minimized. Note that "substantially free of" herein means that no amount of these components are deliberately contained in the raw materials, and is not intended to exclude even the incorporation thereof in impurity level. Objectively, this means that the content of each component is less than 1000 ppm.

The deformation point of the chalcogenide glass is preferably 200 to 400° C. and particularly preferably 220 to 340° C. The softening point thereof is preferably 230 to 430° C. and particularly preferably 250 to 370° C.

EXAMPLES

Example

Hereinafter, the present invention will be described with reference to examples, but is not limited to the examples.

A lens in Example was produced in the following manner. Raw materials were mixed to give, in % by mole, a composition of 61% S, 5% Ge, 1% Bi, and 33% Sb, thus obtaining a raw material batch. Next, a silica glass ampoule washed in pure water was evacuated with the application of heat, the raw material batch was then put into the silica glass ampoule, and the silica glass ampoule was sealed with an oxygen burner while being evacuated.

The sealed silica glass ampoule was raised in temperature to 650 to 1000° C. at a rate of 10 to 20° C./hour in a melting furnace and then held for six to twelve hours. During the holding time, the silica glass ampoule was turned upside down every two hours to stir the melt. Thereafter, the silica glass ampoule was taken out of the melting furnace and rapidly cooled to room temperature, thus obtaining a chalcogenide glass (deformation point: 240° C., softening point: 270° C.)

The obtained chalcogenide glass was processed in the shape of a preform. After the processing, the preform was fired at a temperature 10 to 20° C. lower than the deformation point in a nitrogen atmosphere for six to twelve hours, thus removing surface-adsorbed water on the glass.

The preform after the firing was heated to a temperature 10 to 20° C. higher than the deformation point in a nitrogen atmosphere and hot-press molded into a meniscus lens shape in a mold assembly having an optically polished surface, thus obtaining a lens. The surface of the obtained lens was observed with a digital microscope. FIG. 1 shows a photograph of a surface state of the lens. The number of depressions formed in the lens surface and having a diameter of not less than 2.5 μm and not more than 100 μm per unit area (1 mm×1 mm) was six, which showed a good surface quality.

Comparative Example

A lens was obtained in the same manner as in Example except that a chalcogenide glass was hot-press molded without firing of its preform. FIG. 2 shows a photograph of a surface state of the lens. The number of depressions formed in the lens surface and having a diameter of not less than 2.5 μm and not more than 100 μm per unit area (1 mm×1 mm) was 162, which showed a poor surface quality.

INDUSTRIAL APPLICABILITY

The infrared-transmissive lens produced according to the present invention is suitable as an optical element, such as a lens for focusing infrared light on an infrared sensor section of an infrared camera.

The invention claimed is:

1. A method for manufacturing an infrared-transmissive lens, the method comprising:
    firing a preform of a chalcogenide glass in an inert gas atmosphere to obtain a fired body and then subjecting the fired body to hot press molding; wherein
    a softening point of the chalcogenide glass is 250 to 370° C.; and
    the preform is fired for six to twelve hours.

2. The method for manufacturing an infrared-transmissive lens according to claim 1, wherein the preform is fired at a temperature 0 to 50° C. lower than a deformation point of the chalcogenide glass.

3. The method for manufacturing an infrared-transmissive lens according to claim 1, wherein the preform is fired in a nitrogen atmosphere.

4. The method for manufacturing an infrared-transmissive lens according to claim 1, wherein the fired body is subjected to the hot press molding at a temperature equal to or higher than a deformation point of the chalcogenide glass and equal to or lower than the softening point of the chalcogenide glass.

5. The method for manufacturing an infrared-transmissive lens according to claim 1, wherein the fired body is subjected to the hot press molding in an inert gas atmosphere.

6. The method for manufacturing an infrared-transmissive lens according to claim 5, wherein the fired body is subjected to the hot press molding in a nitrogen atmosphere.

7. The method for manufacturing an infrared-transmissive lens according to claim 1, wherein the chalcogenide glass contains at least one of S, Se, and Te.

8. The method for manufacturing an infrared-transmissive lens according to claim 1, wherein the chalcogenide glass contains S+Se+Te in an amount of 30 to 80% by mole.

9. The method for manufacturing an infrared-transmissive lens according to claim 1, wherein the chalcogenide glass is substantially free of As.

* * * * *